INVENTORS
Werner MADGE
Joachim HILGENDORF

FIG.6

United States Patent Office 3,553,649
Patented Jan. 5, 1971

3,553,649
SYSTEM AND METHOD FOR INTAKE AND EJECTION OF FORMS IN A DATA PROCESSING MACHINE
Werner Mädge and Joachim Hilgendorf, Villingen, Germany, assignors to Kienzle Apparate G.m.b.H., Villingen, Germany
Filed Sept. 22, 1967, Ser. No. 669,837
Claims priority, application Germany, Sept. 28, 1966, K 60,338
Int. Cl. G06f 3/00
U.S. Cl. 340—172.5                      14 Claims

ABSTRACT OF THE DISCLOSURE

Account card has magnetic strip along side. Simultaneous intake and reading, and ejection and recording. Intake movement limited to (1) first line without print or (2) end of magnetic symbols followed by return to empty line. Ejection movement limited to: (1) immediate ejection and recording or (2) movement in intake direction until enough room available on strip to record all data, followed by eject and record.

BACKGROUND OF THE INVENTION

This invention relates to a system and a method for the intake and ejection of forms in a data processing machine. In particular this invention relates to the ejection and intake of forms having signal carrier means as for example a magnetic strip, along one side. Data must be read from the strip, new data recorded on it and the forms correctly positioned for printing additional printed information on the first empty line on said form.

Arrangements are known for data processing machine in which a magnetic strip is located on the form perpendicular to the intake direction of the form. In this case, the magnetic strip is generally located at the lower edge of the form or accounting card, so that this strip passes the printing arrangement first during the intake of the card. In such an arrangement where the strip is located transverse to the intake direction, it cannot be avoided that the sensing heads for the reading and recording of the magnetic markings also move transverse to the intake direction. Thus, this method causes a not inconsiderable loss of time, since each time two completely separate movements must take place sequentially. First, the form must be brought into the correct position relative to the printing mechanism. That is, the first empty line must be found and the intake of the form must be stopped in such a way that the first empty line is in the proper position for printing. However, a further movement, namely a movement of the form relative to the magnetic heads, or rather, vice versa, a movement of the magnetic heads relative to the card, must also take place in order for the magnetic markings to be read or recorded.

In order to prevent such a double sensing and intake movement, machines are known in which the magnetic strips have been mounted on the side edge of the form so that the reading of the magnetic strips may take place simultaneously with the intake movement. Several problems result with this arrangement. If the magnetic strip is kept relatively short, the amount of data which may be stored on it is limited. However, if the magnetic strip is lengthened, but it is still desired to print the form continuously from top to bottom, the difficulty results that the form must "hunt" in the intake mechanism. The term "hunting" here is meant to signify a movement of the form in which first a movement in the intake direction results for a predetermined length, during which the signals on the magnetic strip are read, and thereupon a movement backward in the ejection direction until the first empty line has been found. During the ejection of the card this "hunting" takes place in the opposite sequence. First the cards are moved in the intake direction until such a point that the amount of room on the magnetic strip will in any case be sufficient to accommodate the data which it is desired to record, and then the card is ejected in the ejection direction, while the new data is entered onto the magnetic strip.

For known arrangements of this type the control of the intake and ejection movement is by means of predetermined amounts; that is, it is determined in advance that, for example, the magnetic markings on the strip will extend at the most to the top margin of the form. The intake movement is then so controlled that the card is always advanced to this margin and then is returned in the ejection direction until the empty line is found. Control of the intake movement for a predetermined distance is generally accomplished by mechanical means. However, it has now been found possible to limit the extent of these movements to conform to the actual extent of the recorded data. For many uses of the machine, for example, only few markings will be entered on the magnetic strip. In this case, of course, a very great unnecessary loss of time results when in spite of these few markings the card must first be advanced to the top margin and then returned in the ejection direction in order to find the empty line. In addition, unnecessary wear of the magnetic heads results from this procedure.

SUMMARY OF THE INVENTION

It is therefore the object of this invention to control the intake and ejection movement of the form in dependence on the empty line location and on the amount of markings on the signal carrier means. Thus, the invention comprises a system for a data processing machine utilizing forms having elongated signal carrier means extending in direction of advancement of said forms and carrying a "data end" signal, said forms being further adapted to hold printed data. This system comprises empty line locating means for creating an empty line signal when the first empty line following previously entered printed data passes a predetermined location in said machine during advancement of said forms. It further comprises reading means for reading said signals on said signal carrier means, including said "data end" signal. Also comprised are means for stopping the advancement of said forms upon receipt of said empty line signal, if said "data end" signal has been previously generated. If said "data end" signal has not been generated upon generation of said first empty line signal, means are provided for generating a distance signal as a function of the distance said form is advanced between the creation of said empty line signal and the occurrence of said "data end" signal. Finally, means are provided for moving said form in the ejection direction upon receipt of said "data end" signal and for a distance corresponding to said distance signal, thus positioning said form in proper position for printing.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
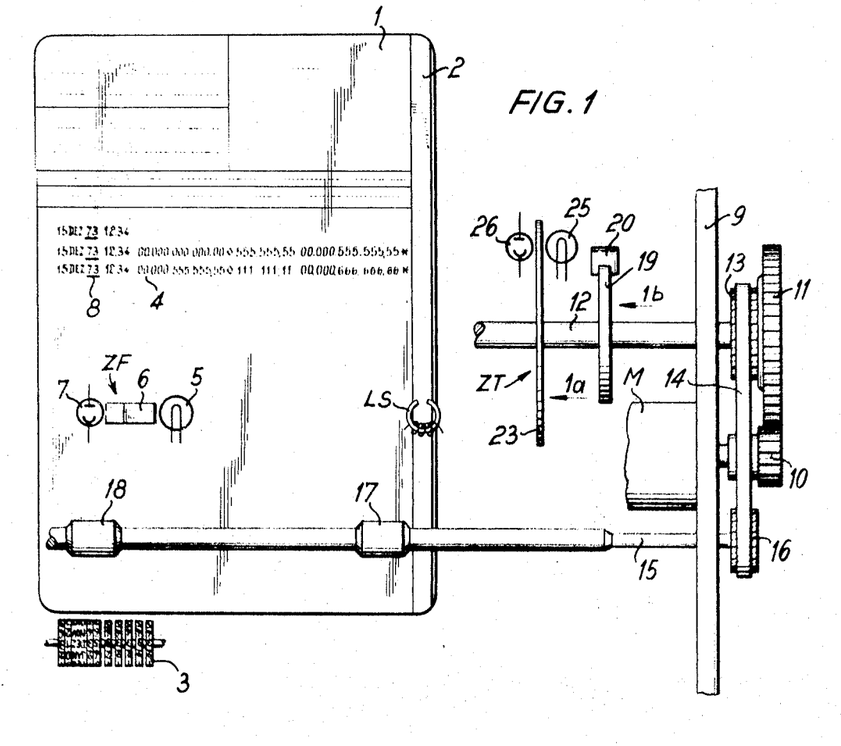
FIG. 1 is a schematic representation of the mechanical parts of the form intake and positioning arrangement.
Figure 1A:
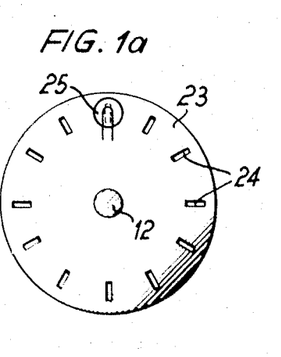
FIG. 1a is a detail of FIG. 1.

An accounting card 1, one embodiment of a form whose intake into, and ejection from a data processing machine are to be controlled, is shown in FIG. 1. The card 1 has signal carrier means, in this case a magnetic strip 2, extending along the full length of the right-hand margin. In order to enter the accounts, the accounting card or form is advanced to a printing means 3 one embodiment of visual output furnishing means, by means of a form intake arrangement. This form intake arrangement, of which only a part is visible in FIG. 1, is normally arranged on the carriage of an accounting machine. The form is put into a funnel in front and then is transported during the intake interval until the first empty line following the last printed line 4 is in position in front of the printing means 3. Automatic line locating means, in this case the optical arrangement ZF, consisting of a lamp 5, a prism 6, and a photocell 7 are provided to locate the next line at which printing is to take place. This automatic line locating means is generally located in a lateral pocket of the funnel of the intake arrangement. It is positioned in such a manner that the photocell 7 is opposite the line 8 which appears in a specified place, for example under the number signifying the year in the date on the card. If no card is in the intake means, the current flowing in the photocell is relatively small since the back wall of the intake funnel is blackened and thus little light is reflected from lamp 5 through prism 6 and the back wall of the input funnel to the photocell 7. Only when a card is put in, and more light coming from the lamp 5 is reflected from the light background of the card is a step voltage induced in the photocell which is used to activate the intake mechanism.

Figure 1B:
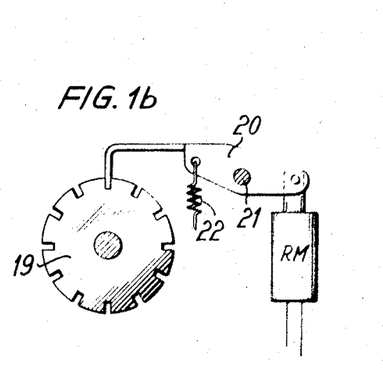
FIG. 1b is a further detail of FIG. 1.

The motor M which is fastened to the lateral plate 9 of the intake means, is activated and drives the gear 10 which in turn is connected to another gear 11. A friction coupling between the motor M and the gear 10 allows the starting and stopping of the motor even when the remainder of the gearing is not free to move. The gear 11 is fastened to shaft 12 which also carries a chain drive 13. The movement of the shaft 12 is transferred to the actual intake shaft 15, one embodiment of moving means, by means of the chain 14, that is by the chain gear 16. The intake rollers 17 and 18 are arranged on the shaft 15. These rollers are in contact with the forms and advance these in the intake or ejection direction by means of counterpressure rollers, which are not shown, in a friction drive arrangement. Shafts 12 and 15 are also held by a notched disc 19 having a detent 20 which is activated by the detent magnet RM. As shown in FIG. 1b, the detent 20 is mounted on a bolt 21 and is held in contact with the notched disc 19 by means of a spring 22. If the magnet RM is activated, the detent 20 is lifted and the intake means are free to move. Line synchronizing means ZT are also arranged on the shaft 12. These consist of a synchronizing disc 23 having cutout portions 24. On one side of the synchronizing disc 23 is a lamp 25, while on its other side is a photocell 26. Thus every slot 24 passing the lamp 25 and the photocell 26 causes a line pulse to be generated. The turning ratio between shaft 15 and shaft 12 must be so chosen that the line synchronization means ZT yields a pulse for every line by which the form 1 has been advanced.

The circuit of the motor M also contains a relay RS which is not shown in FIG. 1. It is the function of this relay to reverse the current direction in the motor when it is activated, in such a manner, that if the current flows through the relay and the motor simultaneously the motor turns in one direction. If, however, no current flows through the relay RS, the motor will turn in the other direction. In the present embodiment, the direction for which the relay RS is activated corresponds to the intake direction for the form, that is, in FIG. 1, the direction from the bottom towards the top. The direction in which the relay RS is not activated is the ejection direction, that is, in FIG. 1, a movement of the form from the top towards the bottom. Reading means, in this case a read-write head LS, are arranged in front of the magnetic strip 2. It is the function of these reading means to read the magnetic markings contained on strip 2.

Figure 2:
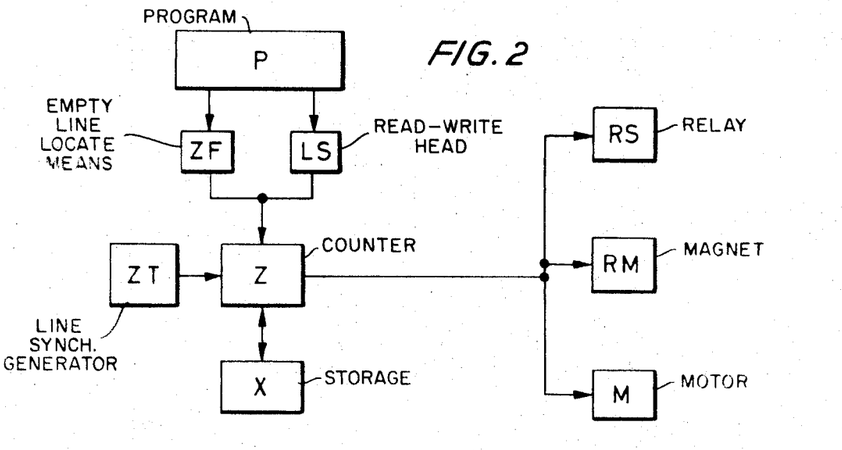
FIG. 2 is a schematic representation of the electronic arrangement for the form intake system.

FIG. 2 is a schematic representation of the electronic control arrangement for controlling the different parts of the mechanical intake means. Electronic computing means, which are combined with the accounting machine, contain a macro-program P. This macro-program P generates the commands for "intake and read" as well as for "ejection and record." These commands activate the empty line locating means ZF and also the read-write head LS. Furthermore, a counter Z, one embodiment of distance measuring means, is furnished which may be in the form of an electronic binary counter, which receives its counting pulses from the line synchronization generator ZT. The counting direction of the counter Z is reversed in dependence on the direction of rotation of the motor. During the intake interval, that is, when the motor, activated by relay RS, transports the form in the intake direction, the counter Z counts forward. When, however, the relay RS is deenergized and the motor moves the form in the ejection direction, the counter Z counts backwards. The empty line locating means ZF and the read-write head LS for the magnetic strip affect the counter Z in such a manner that the counter is not activated if the read head LS issues the data "end" signal (signifying the end of signals recorded on the magnetic strip), before the empty line locating means receive the signal corresponding to the first empty line. However, the counter Z will commence to count pulses if an empty line signal is received from the empty line locating means ZF before the read-write head LS receives said data "end" signal. The counter will count all line pulses which occur between said empty line signal and the aforementioned data "end" signal. FIG. 2 also shows storage means X which may, for example, represent a storage position in a larger magnetic core matrix storage. This storage X may be used to store the number in the counter Z while this counter is reset to zero during the ejection interval.

Figure 3:
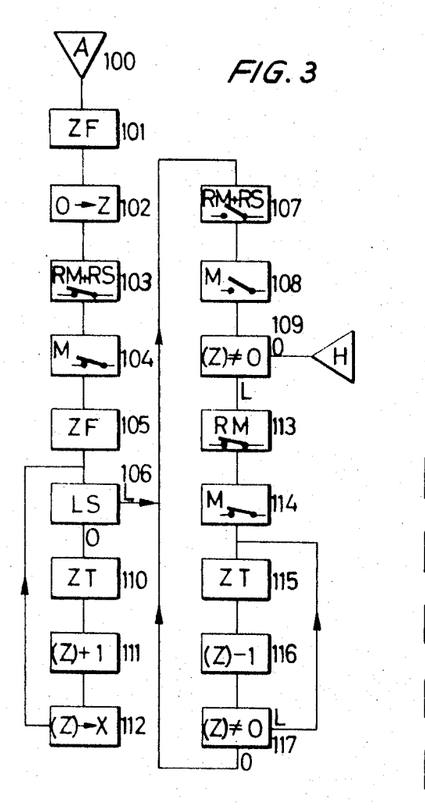
FIGS. 3 and 4 are a more detailed representation of the function sequence according to this invention.
Figure 4:
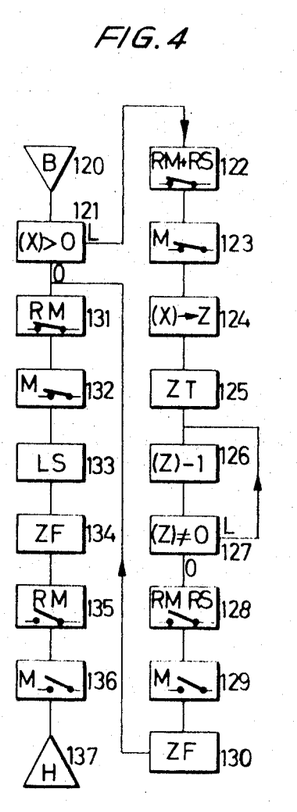

The exact detail of the sequence of operations may be seen by consulting FIGS. 3 and 4.

In the embodiment according to FIGS. 2, 3 and 4, the assumption is made that the empty line locating means ZF, the read-write head LS and the printing means 3 are all arranged at an equal height.

FIG. 3 shows the function sequence for the intake interval. The program P issues a command "intake" which activates both the line locating means ZF as well as the read-write head LS. Insertion of a form 1 results in a voltage step in the empty line locating means ZF caused by the transition from dark to light. This voltage step is used to reset the counter Z to zero and also to activate the magnets RM and the relay RS as well as the motor M. (See steps 100 to 104 in FIG. 3.) As soon as the motor M is running and the notched disc 19 is freed by the activation of the magnet RM, the line synchronization disc ZT begins to rotate. However, the line pulses hereby generated are not immediately utilized. Only after the optical line locating means ZF has received a light-to-dark transition jump, caused by a black marking 8 under the date of the form 1, is the step utilized in order to interrogate whether the read-write head LS has already received the data "end" signal. (See steps 105, 106). If the magnetic head LS has received said data "end" signal, then a signal appears at the "1" output of an associated storage, which in turn interrupts the circuit of the magnet RM and the relay RS. (Step 107.) In this case the reading process had already ended at the time in which the empty line signal was received. The motor M is stopped. After stopping of the motor, the counter Z is interrogated to find out whether it is in the zero position or not. (Steps 108, 109.) If the counter Z is in the zero position, the correct line has been found, the intake interval has ended and no further motion occurs. If, however, said data "end" signal has not been received by the magnetic head LS when the "empty line" signal resulting from the light-to-dark transition of the marking 8 on form 1 is received, then the storage associated with magnetic head LS generates a "zero" signal which causes the pulses generated by the line synchronization disc ZT to be entered into the counter Z. Thus this counter is advanced by 1 for each line that the form is advanced. (See steps 110, 111.) The contents of the counter Z are stored in the storage X so that the contents of the storage corresponds to the contents of the counter. (See step 112.)

If, according to step 109, it is recognized that the counter is not at zero when the motor M stops, then a "one" signal results in reactivation of the magnet RM and the motor M. However, the relay RS is not activated. (See steps 113, 114.) This means that the form is now moved in the ejection direction. It should be noted that for the assumed case in which the data "end" signal is generated after the line locating signal, the form 1 had to be moved past the desired line in order that the contents of the magnetic strip could be read completely. For the above-mentioned movement in the ejection direction, the line synchronization disc ZT again becomes activated. Since the motor is now driven in the backwards direction, this results in a reverse count of the counter Z. Thus for each line in which the form is moved in the ejection direction the line synchronization disc ZT generates a signal which causes the counter Z to decrease its count by one. (Steps 115, 116.) After each switching of the counter Z, the counter is interrogated to find out whether it is now in the zero position. (Step 117.) If the counter is not in the zero position, a signal is generated at counter output "1" which keeps the counter Z activated. If the counter is at zero, a signal appears at the "zero" output and this signal is used to deactivate the magnet RM and the relay RS as well as the motor M (steps 107, 108). A further interrogation occurs to find out whether the counter is now at zero. The intake interval is thus ended.

FIG. 4 shows a function sequence for the ejection interval. A command B is issued from the macro-program. This command is "ejection and record." (Step 120.) As was mentioned above when the intake interval was explained, the condition of the counter at the end of the intake interval (steps 111, 112) is stored in a storage X. The contents of the storage X are now interrogated, to discover whether this storage has a content which is not equal to zero. (Step 121.) Only if the contents of the storage X are different from zero did the data "end" signal arrive after the empty line signal. Only in this case must a movement in the intake direction precede the movement in the ejection direction for the form 1, in order that enough room for the recording of signals may exist. If the contents of the storage X are greater than zero, a signal at the "one" output of step 121 results in activation of the magnet RM, the relay RS and the motor M. The motor thus runs in the direction for intake, since the relay RS is activated (see steps 122, 123). Simultaneously the contents of the storage X are transferred to the counter Z (step 124) and the counter Z is activated, so that the pulses generated by the line synchronization disc ZT are used to effect a backward count in the counter Z. (Steps 125, 126.) After each counting step the counter Z is interrogated to find out if it is at zero. If not, the counting process is continued. (Step 127.) If, however, the zero position has been reached, a signal is again issued to magnet RM and relay RS as well as motor M which deactivates all the aforementioned members. (Steps 128, 129.) The form has now been moved in the intake direction for such a distance that enough room exists on the magnetic strip 2 in order to record all magnetic markings. The empty line locating means ZF senses the form and verifies that there is still a form in the intake funnel, which has to be ejected. (Step 130.) This signal is utilized to reactivate the magnet RM and the motor M. (Steps 131, 132.) Simultaneously the read-write head LS is activated so that this now records the signals during the movement of the card in the ejection direction (Step 133). When the form has been ejected due to the movement of the intake gearing, then the empty line locating means ZF receives a light-to-dark signal. (Step 134.) This is used to deactivate the magnet RM and the motor M, so that the arrangement is now at rest. (Step 137.)

In the embodiment of the electronic control arrangement, as described in FIGS. 2 to 4, it was assumed that the empty line locating means and the read and write heads LS were arranged at the same height as the printing means 3. This, however, is seldom the case because the required space is seldom available.

Figure 6:
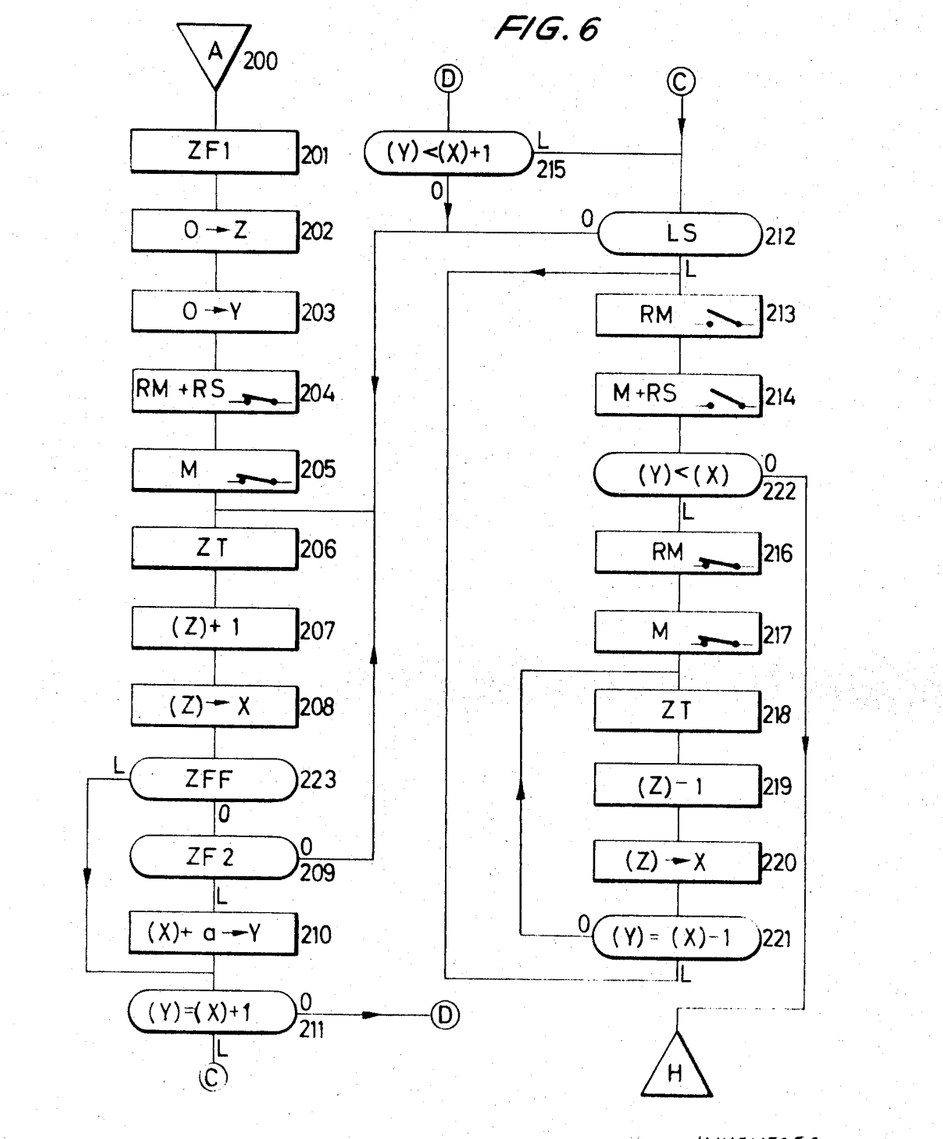
FIGS. 6 and 7 are a sequence diagram for form intake and ejection according to the system of FIG. 5.
Figure 7:
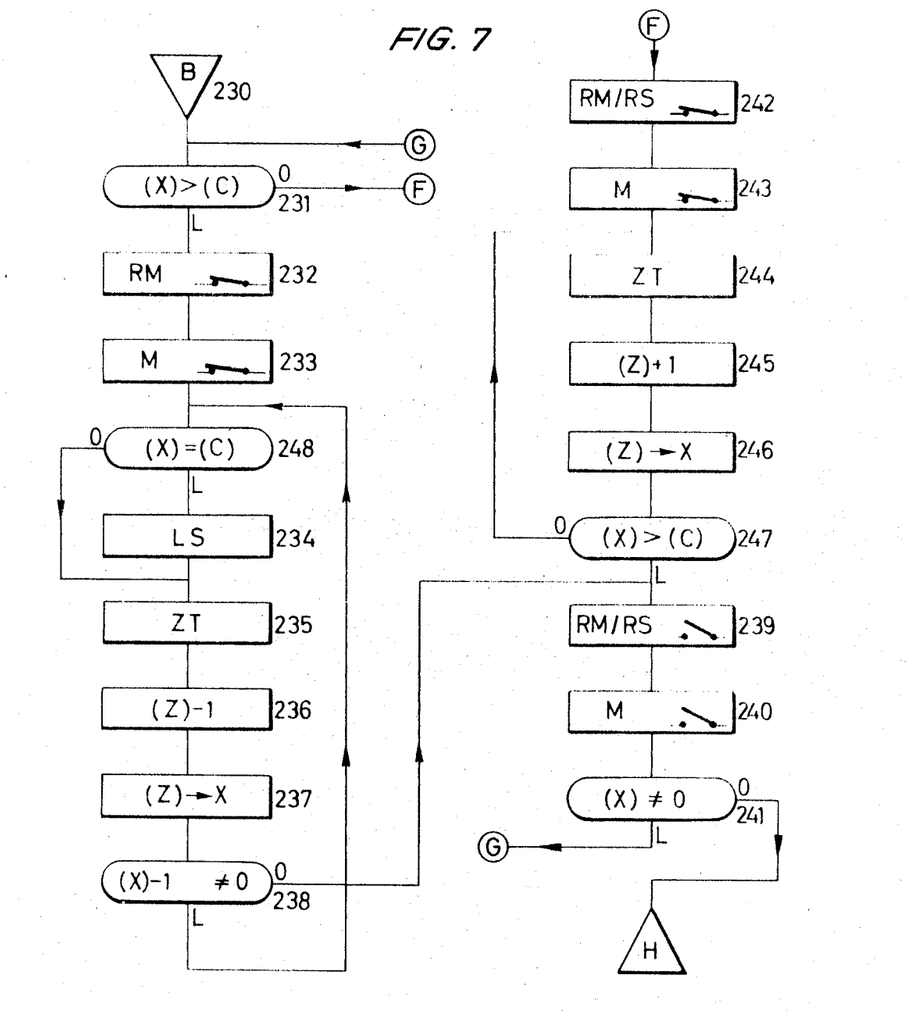

Generally, as was already described in reference to FIG. 1, the empty line locating means and the read-write head LS are arranged in side pockets of the intake arrangement and the actual printing means 3 are arranged under these at a distance of approximately 10 centimeters. Where such an arrangement exists, the distance between the empty line locating means and the actual printing means must be considered for the intake process. This is illustrated in an embodiment of the electronic control arrangement as shown in FIGS. 5, 6 and 7.

Figure 5:
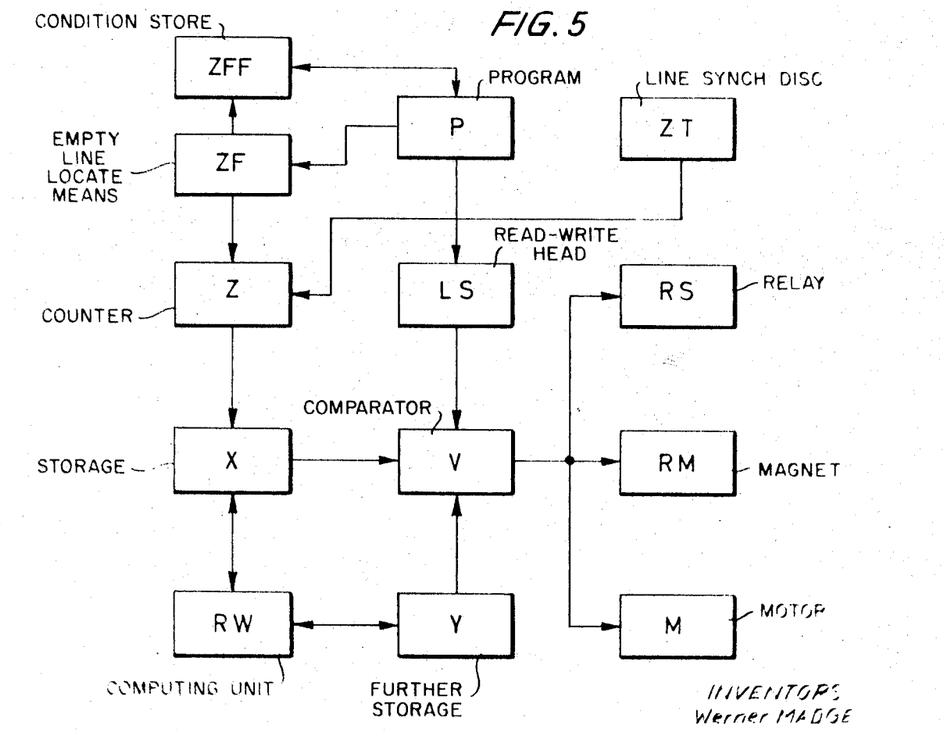
FIG. 5 is a schematic representation of another embodiment of the form intake and positioning system.

Insofar as the parts illustrated in FIG. 5 are the same as those shown in FIG. 2, the same reference letters are used. Here, too, empty line locating means ZF and the read-write head LS are present and are activated by a command, either "intake and read" or "ejection and record" emanating from the program P. The empty line locating means ZF operates a condition store ZFF, which is a usual flip-flop, and which is set to its "one" state by the light-to-dark signal generated at the empty line locating means ZF by a marking 8, while it is set to its "zero" state by the dark-to-light signal generated at ZF by the insertion of a form. Also present are the line synchronization disc ZT, which affects the counter Z by causing a stepwise advance of this binary counter in either the forward or the backward direction, and the storage X which allows storing of the number in the counter Z. In addition to these, a further storage Y and a computing unit RW are provided as well as a comparison stage V. The storage X stores the number contained in the counter Z, that is the so-called actual address of the form, that is the line corresponding to the position of the form 1 at the particular point in time. The additional storage means Y, however, store the so-called desired address. This desired address is derived from the actual address in that moment in which the empty line locating means ZF have generated a symbol corresponding to the line 8. The desired address results from the addition of the number in the counter Z (or in other words the contents of the storage X) to a constant $a$. This constant $a$ is a measure for the number of lines which the form must pass between the empty line locating means ZF and the printing means 3. The computing unit RW serves to carry out this and other necessary arithmetic operations. It is in the main an electronic binary adder. The comparison stage V serves to compare the contents of the storages X and Y which may have been corrected by one unit if necessary. If certain predetermined conditions are met, corresponding sigals are than passed from said comparison stage to the motor M, the magnet RM, and the relay RS.

The above processes will now be described in detail with reference to FIGS. 6 and 7. Herein FIG. 6 represents the functional sequence for the intake interval and the reading of the recorded signals, while FIG. 7 represents the ejection period or the recording. First, a command A is received from the program which activates both the empty line locating means and the read-write head LS. The introduction of the form results in the previously mentioned dark-to-light voltage step in the empty line locating means ZF. (Steps 200, 201.) This signal is used to set the counter Z and the additional storage means Y containing the desired address to zero. (Steps 202, 203.) The magnet RM as well as the relay RS are activated. The relay RS causes the motor M to run in the intake direction (Steps 204, 205.) As soon as the motor runs, line pulses are generated by the line synchronization disc ZT. Thus the counter Z which has previously been set to zero is advanced one step for each line pulse. (Steps 206, 207. The number in the counter is always stored in the actual address storage X. (Step 208.) This counting process continues until the empty line locating means ZF sense the marking 8 on the form 1 and thus generate a light-to-dark voltage step (ZF 2), which also sets the conditon store ZFF to its "one" state. (Step 209.) An additional step 223 exists between steps 208 and 209. This step serves to interrogate the condition store ZFF, whether it is in its "1" or "0" state. The purpose of this step will be further explained below. In that moment in which during the implementation of program step 209 a "1" signal is generated, the contents of the actual address storage X are transferred into the computing unit RW, the constant $a$ is added thereto and the result is stored in the additional storage Y. This results in the formation of the desired address. (Step 210.) The counter Z continues to count. After each line pulse the comparison stage V determines whether the contents of the desired address counter Y are equal to the contents of the actual address counter $X+1$. (Step 211.) Adding of 1 to the contents of the actual address storage is necessary because the magnet RM must be deactivated one line prior to the desired line in order that the motor and the detent 20 cause the noched disc 19 to stop in the correct position. If the comparison stage V generates a "1" signal, that is if $Y=X+1$, then the magnetic head LS is interrogated to find out whether the data "end" signal has been received as yet. (Step 212.) If this is not the case, a "0" signal is generated which causes the counter Z to remain activated. The program steps 206, 207, 208, 223 and 211 therefore continue to be performed until the read-write head LS generates a "1" signal, that is until the data "end" signal has been received. The "1" signal from the read-write head LS is utilized according to steps 213 and 214 to interrupt the current in the magnet RM as well as in the motor M and the relay RS. This stops the movement of the form in the intake direction.

It is desired now to examine the case in which a comparison of $Y=X+1$ according to step 211 results in a "0" signal. In this case an additional comparison is carried through. It is determined if Y is smaller than $X+1$. In other words, it is desired to determine whether the desired address is smaller than the actual address diminished by 1. In this case the desired line (desired address) has already been passed without the appearance of an data "end" signal. If this is not the case, then a signal is generated at the zero output (step 215). The counting process must be continued. Steps 206, 207, 208, 223 and 211 are repeated until step 211 indicates an equality or the result of the comparison step 215 is that Y is smaller than $X+1$. The additional step 223 is necessary for this program sequence 206, 207, 208, 223 and 211 in order that steps 209 and 210 may be skipped after the receipt of the empty line signal ZF2. This is essential to prevent a continuous changing of the desired address (sep 210). When Y as actually less than $X+1$, a signal is generated at the "1" output and transmitted to the read-write head LS. If a signal is present here, steps 213 and 214 are carried out as discussed above. After the intake arrangement is at rest (end of step 214), the contents of the desired address storage Y are compared with the contents of the actual address storage X (step 222). If the actual address is equal to Y, the correct line position has been reached and a zero signal is generated which signifies that intake has been accomplished correctly, the line has been found and the signals have been read completely. The accounting process may now be continued.

If, however, the comparison of Y with X (Step 222) shows that Y is smaller than X, that is that the form has advanced further than the desired line, then a "1" signal appears which results in the reactivation of the detent magnet RM and the motor M. (Steps 216, 217.) In this case the relay RS is not activated so that the motor now turns in the ejection direction and thus moves the form in the ejection direction also. The line pulses generated by the line synchronization disc ZT are subtracted from the number in the counter Z, that is the counter counts backward. (Steps 218, 219.) After each counting step, the contents of the counter Z are transferred to the actual address storage X, and it is simultaneously determined whether $Y=X-1$. The reduction of the actual address 1 by one unit is analogous to program step 211 and is necessary in order that the detent magnet RM be deactivated one step before the attainment of the actual desired position, in order to allow the detent 20 to make the correct connection with the notched disc 19.

As long as the desired address is not equal to the actual address diminished by 1 ($Y \neq X-1$, step 221), a signal 0 is generated which results in the repetition of steps 218, 219, 220 and 221. This continues until a "1" signal is generated after step 221, that is until the desired address is equal to the actual address decreased by 1. In this case the "1" signal is utilized to repeat the program steps 213, 214 and 222 one more time so that the arrangement is in the correct line position after the comparison Y less than X is negative.

An alternate method would be to delay the signal generated by the empty line locating means and cause the empty line signal to be generated only when the empty line is actually opposite the printing means.

The ejection process takes place in an analogous manner to the above-described intake process. This is shown in the diagram in FIG. 7. Again a command B is first issued by the program P. (Step 230.) This program command contains simultaneously a constant C which is a measure for the length of the magnetic signal on the form 1. It is to be expected that within a defined program the word length of the information to be recorded remains the same or at the most varies by a minor amount. Thus the constant C is so chosen that it is certain that during the ejection process the form is first advanced in the intake direction for a sufficient distance that all signals will have room on the magnetic strip. The actual address is stored in the X storage, so that following the command a comparison between the actual address and the constant C may take place. (Step 231.) If the actual address (storage X) is larger than the constant C, that is the last printed line is over the limit for the recording or reading, then a "1" signal is generated and the motor M and the detent magnet RM are activated according to steps 232 and 233. Since the relay RS is not activated, the motor runs in the ejection direction. It is now determined, according to step 248, whether X is equal to C. As long as this is not the case, the read-write head LS need not be activated and a "0" signal is generated which serves to skip step 234. If, however, X is equal to C, the magnetic head LS is activated in step 234 and the signals are recorded. Since the motor is running, the line synchronization disc ZT generates pulses according to step 235, which are fed to the counter Z. Since the relay RS is not activated and the motor is running in the ejection direction, the counter Z counts backward, that is the count is decreased by one unit for each pulse generated by the line synchronization disc ZT. The number at the counter at any particular time is stored in the actual address storage X (steps 235, 236, 237). Furthermore, comparison is conducted by comparison stage V (step 238) in order to determine whether the contents of the actual address storage $X-1$ are not equal to 0. As long as this is the case, a "1" signal is generated at the output which causes the steps 248, 235, 236, 237 and 238 to be repeated. If, however, for the comparison $X-1$ not equal to 0 a signal appears at the "0" output, that is if $X-1$ is actually equal to 0, then the magnet RM and the motor M are deactivated according to steps 239, 240 and 241. Another comparison is conducted to see whether X is unequal to 0. If X is equal to 0, the arrangement is brought to rest and the ejection has been completed.

So far the case has been considered in which the actual address at the beginning of the ejection period was larger than the constant C. We shall now consider the case where the result of the comparison shows that X is smaller than C. In this case the "begin writing" on the magnetic strip 2 is above the last printed line. Thus, in this case a zero signal is generated after step 231, which initiates step 242 over connector F. That is, the magnet RM and the relay RS are activated as is the motor M (step 243). Thus the form is moved in the intake direction. Because of this movement, and in accordance with step 244, line synchronization disc ZT generates line pulses which advance the counter Z by one step each (steps 245, 246). This causes a decrease of the actual address stored in the actual address storage X. Hereafter a comparison is made whether the actual address is larger than the constant C. As long as this is not the case, steps 244, 245, 246 and 247 repeat. However, as soon the actual address is greater than C, that is in that moment when the position of the form relative to the read-write head LS is such that all data may be received, then a "1" signal is generated which initiates the steps 239, 240, 241. At the end of step 241, a "1" signal is generated which is connected to the beginning of the sub-program by means of connector G, so that the program steps 231–241 and 248 are again repeated in sequence, as was previously described.

While the invention has been illustrated and described as embodied in a particular type of form intake and ejection system in a data processing machine, it is not intended to be limited to the details shown, since various modifications, structural and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a data processing machine having visual output means for furnishing visually readable data: an intake arrangement for forms having elongated data signal carrier means extending in the direction of intake of said forms, said elongated data signal carrier means carrying a "data end" signal, said forms further having recording space for recording said visually readable data in lines extending substantially perpendicularly to the direction of intake, comprising, in combination, empty line locating means for creating an empty line signal when the first empty line following previously entered visually readable data passes a predetermined location or point in said machine; reading means for reading the signals on said data signal carrier means and storing said "data end" signal when read, thus furnishing a stored "data end" signal; stopping means responsive to said empty line signal for stopping the intake of said forms in the presence of a stored "data end" signal; distance measuring means responsive to said empty line signal in the absence of a stored "data end" signal for generating a distance signal corresponding to the distance said form is advanced into said machine from receipt of said empty line signal to receipt of said "data end" signal; moving means for moving said form relative to said machine; and means for activating said moving means to move said form in the ejection direction for a distance corresponding to said distance signal, upon receipt of said "data end" signal.

2. A system as set forth in claim 1, wherein said distance measuring means comprise line signal generating means for generating a line signal each time the position of the form is changed by one line; and counting means for counting the number of line signals from creation of said empty line signal to the generation of said "data end" signal.

3. A system as set forth in claim 2, wherein said moving means comprises a rotary intake and eject mechanism adapted to move said form at one-line intervals; and wherein said line signal generating means comprise a light source; photoelectric means for generating current when said light impinges on said photoelectric means; and means for alternately permitting and impeding said light from impinging on said photoelectric means in synchronism with said intake and eject mechanism in such a manner that a signal is generated each time said form is moved one line by said intake mechanism.

4. A system as set forth in claim 1, also comprising means for storing said distance signal, thus furnishing a stored distance signal.

5. A system as set forth in claim 4, also comprising means for activating said intake and eject mechanism in the intake direction for a distance corresponding to said stored distance signal, upon receipt of an external "eject and record" signal; recording means for recording signals on said signal carrier means; and means for simultaneously activating said recording means and said eject mechanism when said form has been moved said distance.

6. A system as set forth in claim 5 wherein said visual output furnishing means comprise printing means located at a predetermined distance from said empty line locating means in direction of intake of said form; means for generating an actual address signal to correspond to the actual location of said form; said means including said distance measuring means; additional storage means; means for adding a constant signal corresponding to said predetermined distance between said empty line locating means and said printing means to said actual address signal upon creation of said empty line signal, thus generating a desired address signal, said distance signal constituting the difference between said desired address signal and said actual address signal; and means for transferring said desired address signal to said additional storage means.

7. A system as set forth in claim 6, also comprising comparator means for comparing said actual address signal to said desired address signal; and wherein said stopping means are adapted to stop the advancement of said forms if said "data end" signal is received before said actual address signal is equal to said desired address signal diminished by one unit.

8. A system as set forth in claim 6, wherein said means for activating said ejection means in such a manner that said form is moved a distance proportional to said distance signal comprise comparator means for comparing said actual address signal to said stored desired address signal; and means for generating an "eject" signal adapted to cause said form to be moved one line in the ejection direction whenever said actual address signal exceeds said desired address signal by more than one unit.

9. A system as set forth in claim 8, wherein said "eject and record" signal also comprises a constant; and means for transferring said constant into said additional storage means upon receipt of said "eject and record" signal, thus causing said constant to constitute said desired address during the ejection interval.

10. A system as set forth in claim 5, wherein said visual output furnishing means comprises printing means located at a predetermined distance from said empty line locating means in direction of advancement of said form; further comprising delay means for delaying the signal generated by said empty line locating means in such a manner that said empty line signal is generated only when said empty line is opposite said printing means.

11. A system as set forth in claim 1, wherein said visual output furnishing means comprise printing means.

12. A system as set forth in claim 11, wherein said empty line locating means comprise a mark in a predetermined position on each previously printed line on said form; and photoelectric means responsive to said mark and adapted to generate said empty line signal.

13. A method for the intake and ejection of forms in a data processing machine, wherein information, including a "data end" signal, is read during said intake interval and information is recorded during said ejection interval, and wherein data is printed on said forms after said intake interval, comprising, in combination, the steps of creating an empty line signal when the first empty line following previously printed data passes a predetermined location or point in said machine during intake of said form; stopping the advancement of said form if said "data end" signal is generated prior to said empty line signal; generating a distance signal to correspond to the distance said form passes between the generation of said empty line signal and said "data end" signal if said "data end" signal occurs after said empty line signal; and moving said form in the ejection direction upon receipt of said "end" signal for a distance corresponding to said distance signal, thus assuring that said empty line is at said predetermined location or point for the beginning of the printing.

14. A method as set forth in claim 13, also comprising the steps of storing said distance signals; moving said forms in the advancement or intake direction in response to an external "eject and record" signal for a distance corresponding to said distance signal; and simultaneously recording data and ejecting said forms upon completion of said movement in the intake direction.

References Cited

UNITED STATES PATENTS

| | | | |
|---|---|---|---|
| 2,181,992 | 12/1939 | Ghertman | 197—127 |
| 2,936,870 | 5/1960 | Schmidt | 197—127 |
| 2,971,809 | 2/1961 | Schmidt | 197—127 |
| 3,247,944 | 3/1966 | Templeton | 197—127 |
| 3,323,700 | 6/1967 | Epstein et al. | 197—127UX |

PAUL J. HENON, Primary Examiner

P. R. WOODS, Assistant Examiner

U.S. Cl. X.R.

197—127